(12) United States Patent
Choi

(10) Patent No.: US 10,816,415 B2
(45) Date of Patent: Oct. 27, 2020

(54) FLEXIBLE SENSORS AND METHODS FOR MAKING THE SAME

(71) Applicant: Jae-Won Choi, Copley, OH (US)

(72) Inventor: Jae-Won Choi, Copley, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 74 days.

(21) Appl. No.: 15/431,020

(22) Filed: Feb. 13, 2017

(65) Prior Publication Data

US 2017/0234745 A1    Aug. 17, 2017

Related U.S. Application Data

(60) Provisional application No. 62/293,829, filed on Feb. 11, 2016.

(51) Int. Cl.
*G01L 1/18* (2006.01)
*B60C 23/04* (2006.01)
(Continued)

(52) U.S. Cl.
CPC ............ *G01L 1/18* (2013.01); *B29D 30/0061* (2013.01); *B33Y 80/00* (2014.12); *B60C 23/04* (2013.01);
(Continued)

(58) Field of Classification Search
CPC ........ B29D 2030/0077; B29D 30/0061; B33Y 80/00; B60C 23/04; B60C 23/20; B60C 23/0435; B60C 23/0416; B60C 23/0489; B60C 23/0488; B60C 23/0415; B60C 223/0447; B60C 23/0494; B60C 23/062; B60C 23/0457; B60C 23/0459; B60C 23/0466; B60C 23/0471; B60C 23/0486;
(Continued)

(56) References Cited

U.S. PATENT DOCUMENTS 8,786,033 B2 *   7/2014   Saito ....................... G01L 1/205
                                                                                    257/414
2004/0150499 A1 *  8/2004   Kandler .............. B60C 23/0408
                                                                                    336/40
(Continued)

FOREIGN PATENT DOCUMENTS

WO    WO-2015143307 A1 *  9/2015   ............. G06F 3/047

*Primary Examiner* — Randy W Gibson
*Assistant Examiner* — Gedeon M Kidanu
(74) *Attorney, Agent, or Firm* — Renner Kenner Greive Bobak Taylor & Weber

(57) ABSTRACT

A flexible sensor for monitoring operating parameters, including pressure and temperature, of a flexible structure, such as a tire, provides electrodes and an active area that are formed of flexible materials. In particular, the active area may be formed from an elastomeric piezoresistive material, such as an ionic liquid-polymer. The flexible properties of the sensor allow it to be readily incorporated into the body of a tire during manufacture. This allows the operating parameters of the tire to be monitored, such as in real-time, while the tire is in operation. Furthermore, the sensor is formed of materials that allow the sensor to be formed using additive manufacturing techniques, such as 3D (three-dimensional) printing. As such, the sensor may be 3D printed together with another structure, such as a tire tread, so that the sensor is integrated therein.

20 Claims, 4 Drawing Sheets

(51) Int. Cl.
  *B60C 23/20* (2006.01)
  *B29D 30/00* (2006.01)
  *B33Y 80/00* (2015.01)

(52) U.S. Cl.
  CPC ...... *B60C 23/20* (2013.01); *B29D 2030/0077* (2013.01)

(58) Field of Classification Search
  CPC . B60C 23/0408; B60C 23/0493; B60C 11/24; B60C 23/0401; B60C 23/0433; B60C 11/246; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; E01F 9/696; F16D 2066/001; G01L 1/18; G01L 17/00; G01L 17/005; G01L 19/0092; G01L 19/08; G01L 19/083; G01L 19/086; G01L 5/28; G01L 7/166; G01L 1/04; G01B 7/00; G01B 2210/50; G01B 5/18; G01B 11/22; G01D 5/16; G01M 17/02; G01M 17/027; G01M 17/013; G02F 1/31; G02F 2203/12; H02S 10/12; H02S 20/21; H02S 20/22; G01P 3/50; G01R 27/02; G01R 3/00; G06F 3/041; G06F 3/045
  See application file for complete search history.

(56) References Cited

U.S. PATENT DOCUMENTS

| | | | |
|---|---|---|---|
| 2005/0040941 A1* | 2/2005 | Schofield | B60Q 1/2665 340/442 |
| 2006/0090568 A1* | 5/2006 | Silverbrook | G01L 19/0636 73/753 |
| 2006/0145828 A1* | 7/2006 | Muller | B60C 23/0408 340/442 |
| 2008/0202657 A1* | 8/2008 | Hammel | B82Y 15/00 152/152.1 |
| 2010/0288635 A1* | 11/2010 | Komiya | G01B 7/16 204/406 |
| 2015/0109006 A1* | 4/2015 | Choi | G01L 1/04 324/691 |
| 2017/0059426 A1* | 3/2017 | Choi | G01L 5/00 |

* cited by examiner

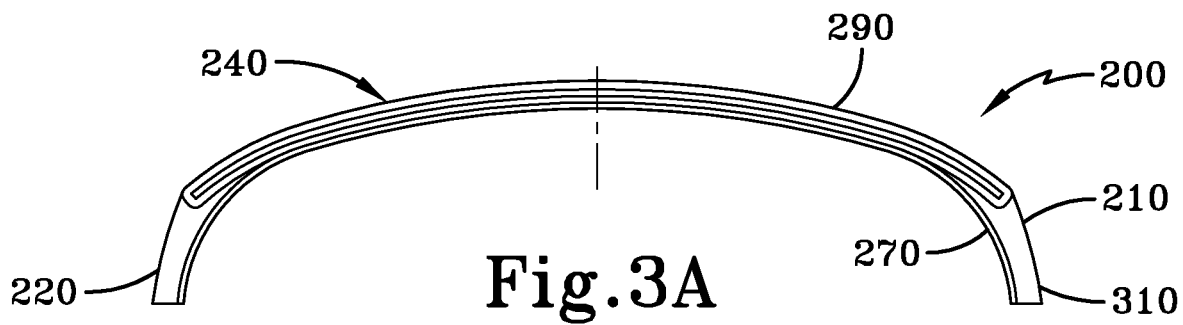
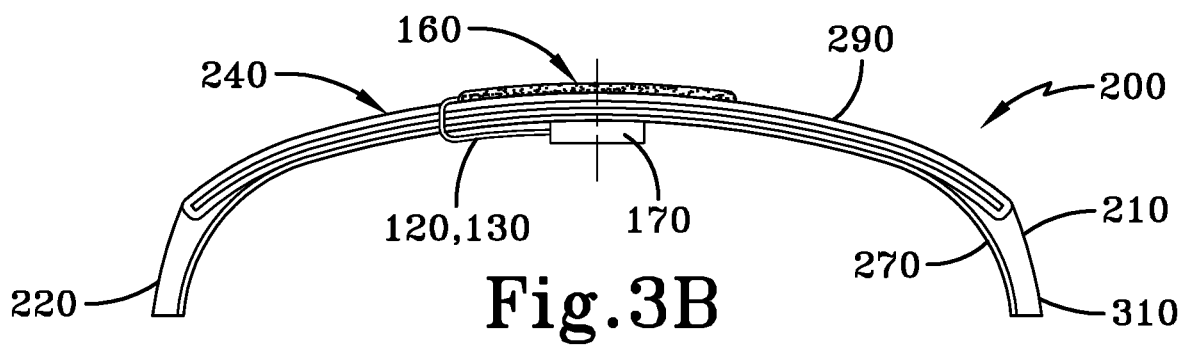
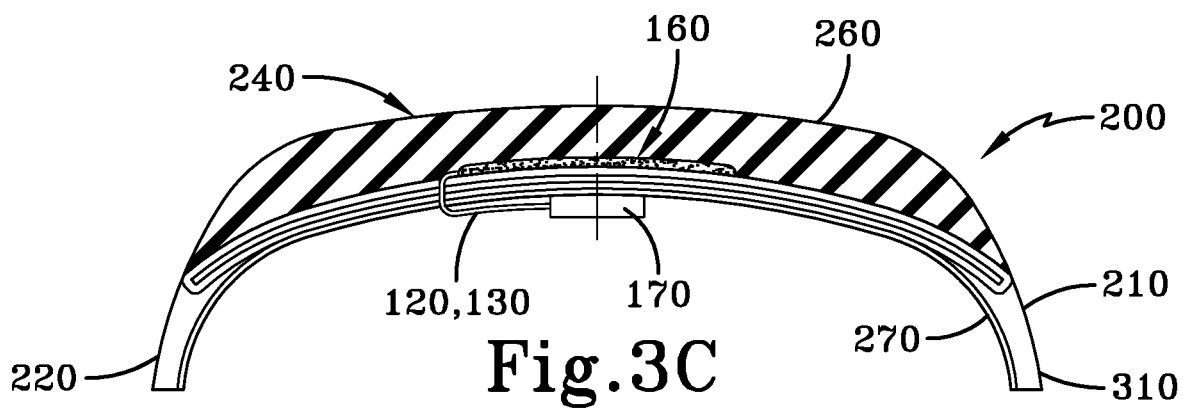
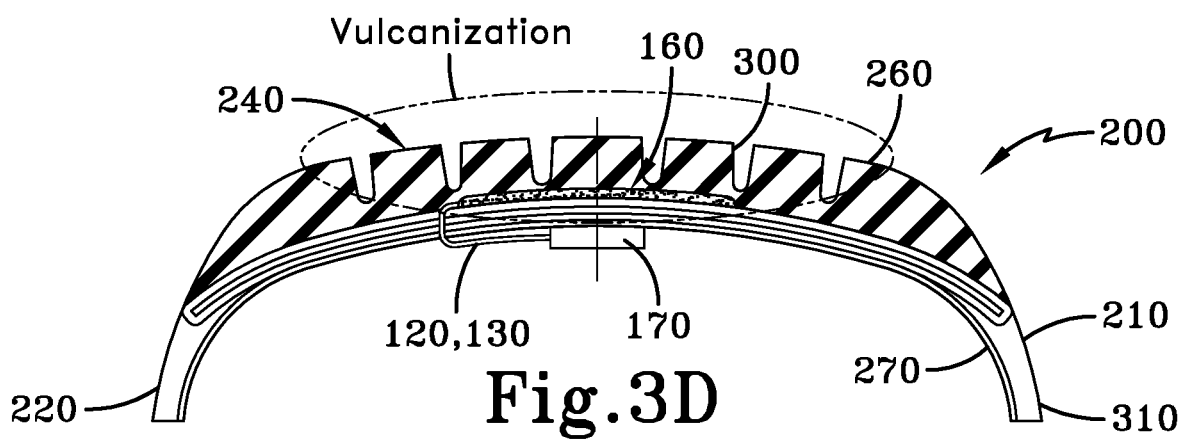

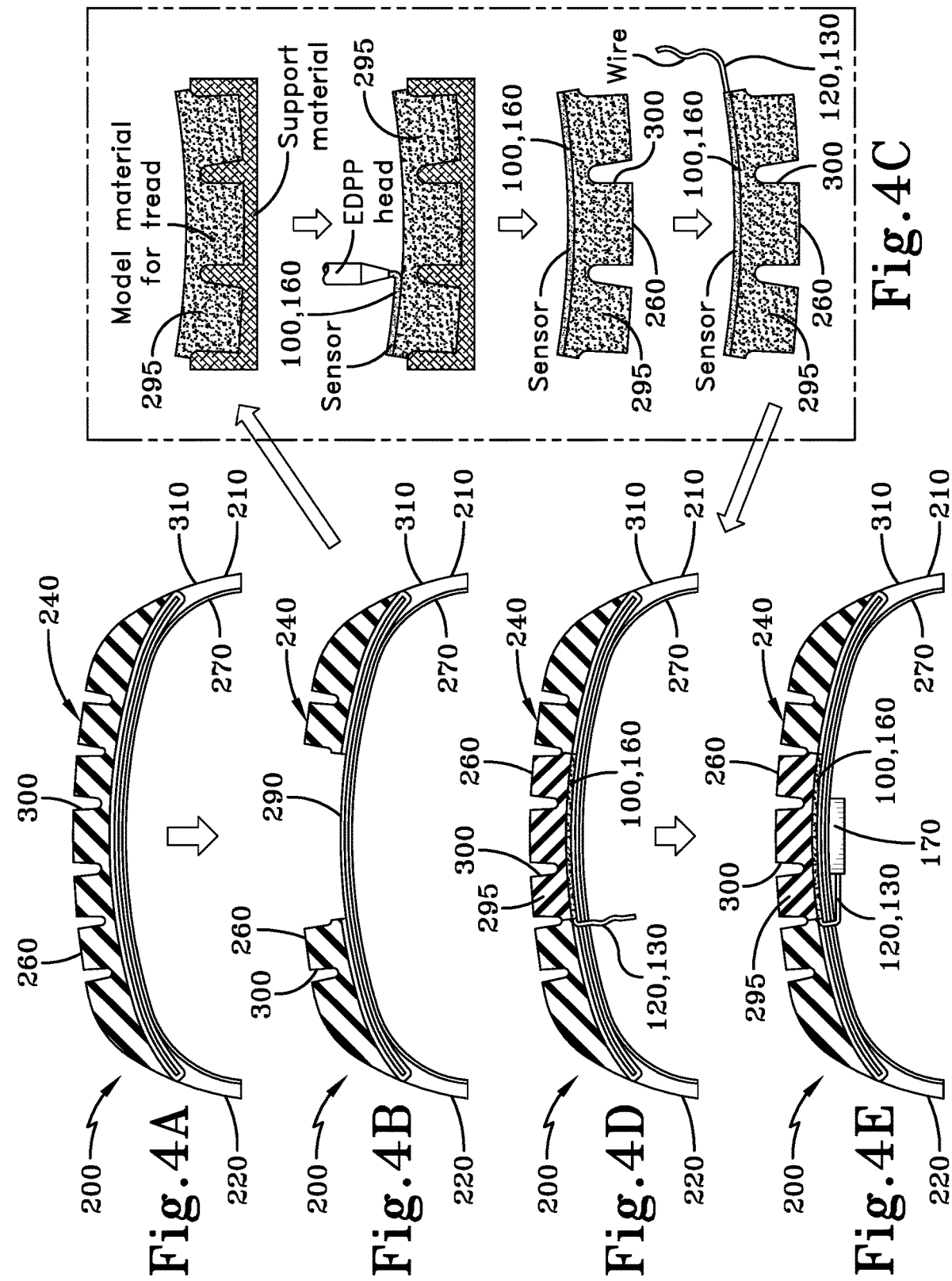

FLEXIBLE SENSORS AND METHODS FOR MAKING THE SAME

CROSS-REFERENCE TO RELATED APPLICATION

This application claims the benefit of U.S. Provisional Application No. 62/293,829 filed on Feb. 11, 2016, the contents of which are incorporated herein by reference.

TECHNICAL FIELD

The embodiments of the invention relate to sensor devices. Particularly, the embodiments of the invention relate to flexible sensors. More particularly, the embodiments of the invention relate to flexible sensors that are used to monitor various operating parameters of a flexible structure, such as a tire.

BACKGROUND

Monitoring the operating parameters of a tire, such as tire temperature and pressure, to identify the structural "health" of a tire, is critical during the development and validation stages of new tire designs. For example, during the tire development stage, a tire design is optimized by capturing data associated with the mechanics or operating parameters of the tire as the tire is subjected to forces imparted by various driving/environmental conditions. Next, the captured operating parameter data is utilized in a design and optimization stage, which may be carried out using finite element analysis (FEA) for example. The goal of the design optimization stage is to verify the final design of the tire, in order to confirm that the tire performs safely, and that the data quantifying the mechanics or operating parameters of the tire is maintained within a predetermined safe range when the tire is in use.

In the tire development stage, a common method of measuring tire mechanics or the operating parameters of the tire, such as tire tread (footprint) pressure, involves the use of a pressure pad. The pressure pad is placed on a ground or road surface, whereupon a vehicle carrying the tire is driven so that the tire is physically passed over the pressure pad. However, since the pressure pad is required to be installed at a specific site on the road, the collection of operating parameter data is limited, in that collected operating parameter data is only able to reflect the driving conditions that are imparted to the tire by the pressure pad. As such, the data collected by the pressure pad is unable to take into account the actual road conditions and other environmental conditions, including the weather, which exists at the time of the testing of the tire. In other words, the requirement that the tire be physically driven over the pressure pad that is located at a fixed position restricts the scope of the dynamic tire tests that can be performed, and thereby limits the scope of operating parameter data that can be collected. Instead of a pad or mat based pressure sensor that is physically contacted by the tire, flexible sensors capable of detecting pressure and/or temperature, which are carried as part of the structure of the tire would be desirable. This would allow the sensor to capture a broad and robust set of operating parameter data beyond that which is capable of being collected by the pressure pad.

In addition to monitoring the operating parameters of a tire during development, it is becoming increasingly important to vehicle consumers to monitor these operating parameters to determine the overall "health" of tires on a vehicle for safety purposes. This is due to the fact that by monitoring the "health" of tires while they are in service on the vehicle allows incipient problems to be detected before they lead to a catastrophic failure of the tire. As a result, potential injury or death to those carried in the vehicle can be avoided. For example, according to the National Highway Traffic Safety Administration (NHTSA), approximately 15,000 car accidents, or 35% of vehicle-related accidents from 2005-2007, were related to the failure or degradation of the tires/wheels on the vehicle. Thus, as concerns for safety grow, tire health monitoring systems that monitor the "health" status of tires in order to prevent their failure will become increasingly desirable, and even necessary.

Therefore, there is a need for a flexible sensor that is capable of monitoring various operating parameters or characteristics of a flexible structure, such as a tire, so that incipient problems associated with the flexible structure can be detected before a catastrophic failure occurs. In addition, there is a need for a flexible sensor or sheet of flexible sensors that are carried by the tire, or flexible structure, so as to be attached to or made integral with the tire or flexible structure to directly monitor its operating parameters while the tire or flexible structure is in use and directly subjected to environmental conditions.

SUMMARY

In light of the foregoing, it is a first aspect of the present invention to provide a tire sensor comprising a tire having a tire body; and a flexible sensor carried by the tire body, the sensor to monitor at least one parameter associated with the operation of the tire.

It is another aspect of the present invention to provide a sensor for monitoring a flexible body comprising a flexible body; and a flexible sensor carried by the body.

It is yet another aspect of the present invention to provide a method of forming a tire sensor comprising providing a tire body at an incomplete stage of manufacture having at least one exposed layer; applying at least one flexible sensor to the exposed layer; applying one or more tire layers over the at least one flexible sensor; and vulcanizing one of the one or more tire layers to form a tire tread.

BRIEF DESCRIPTION OF THE DRAWINGS

These and other features and advantages of the present invention will become better understood with regard to the following description, accompanying drawings, and appended claims, wherein:

FIGS. 3A-D are cross-sectional views of the tire showing a process of incorporating the sheet of flexible sensors into the structure of the tire in accordance with the concepts of the various embodiments disclosed herein; and FIGS. 4A-E are cross-sectional views showing an alternative process of incorporating the sheet of flexible sensors into the structure of the tire in accordance with the concepts of the various embodiments disclosed herein;

DETAILED DESCRIPTION

Figure 1:
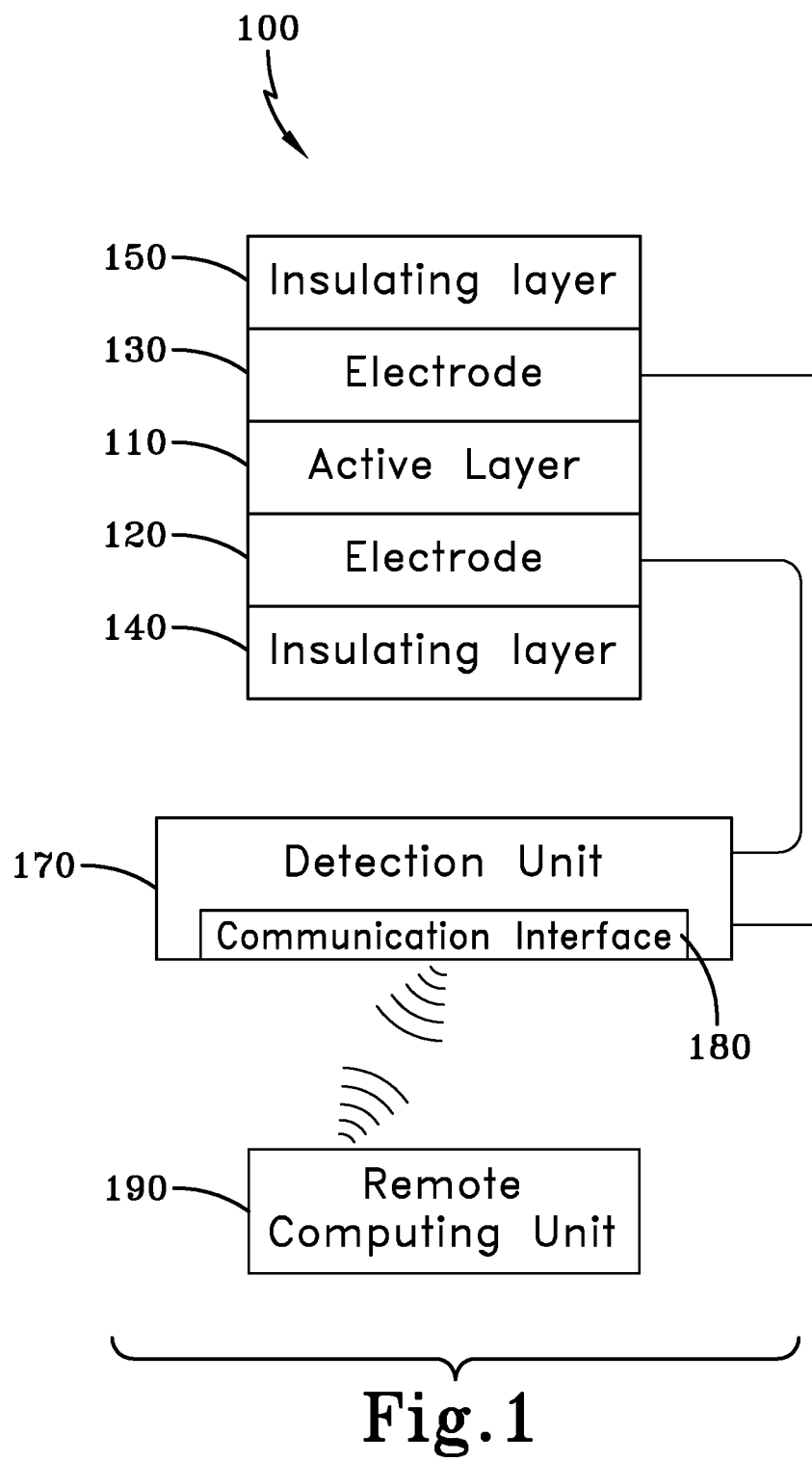
FIG. 1 is a schematic view of a flexible sensor in accordance with the concepts of the various embodiments disclosed herein.

A flexible sensor is generally referred to by the numeral 100, as shown in FIG. 1 of the drawings. The sensor 100 includes an active layer or area 110 that is formed of flexible piezoresistive material, which is positioned between electrodes 120 and 130 that are formed of flexible, electrically conductive material. During operation, the sensor 100 is placed in physical communication with a flexible structure, such as a tire for example, whereupon the flexible sensor 100 detects or otherwise monitors changes in various operating parameters of the flexible structure, such as changes in temperature and pressure, as the flexible structure is in use, including times of static and dynamic operation.

With regard to the arrangements of the layers of the sensor 100, the active layer or area 110 of the sensor 100, as discussed above, is positioned between, and in electrical communication with, the electrodes 120 and 130. Although, in some embodiments, the electrodes 120 and 130 may be positioned adjacent to the active layer 110. However, in other embodiments, the active layer 110 may be separated from one or both of the electrodes 120 and 130 by one or more intervening layers of material, while still allowing the active layer 110 to electrically communicate with the electrodes 120 and 130. In addition, the active layer 110 and the electrodes 120,130 may be arranged in a laminated or layered manner. In some embodiments, the active layer 110 and electrodes 120,130 may be arranged in a planar two-dimensional (2D) configuration, or alternatively arranged in a three-dimensional (3D) configuration, as well as combinations thereof.

The electrically conductive electrodes 120 and 130 are formed from any suitable conductive material, including conductive material that is configured to be, or that is otherwise flexible, stretchable or a combination thereof. In some embodiments, the electrodes 120,130 may be formed of polymeric materials, such as elastomeric material, including a thermoplastic elastomer (TPE) for example, which is made to be electrically conductive using any suitable technique. In other embodiments, the electrodes 120 and 130 may be formed as a composite material that includes one or more electrically conductive nanostructures that are combined with a flexible material, such as elastomeric material for example. The nanostructures may include, but are not limited to: conductive nanowires, carbon nanotubes (CNT), graphene, or combinations thereof. In some embodiments, the CNTs may comprise single or multi-walled carbon nanotubes (MWNT). In addition, the flexible material may include, but is not limited to: polymeric material, such as elastomeric material, including as thermoplastic elastomer (TPE); natural or synthetic polymeric materials, such as natural or synthetic rubber; or combinations thereof. In some embodiments, the elastomeric material may comprise thermoplastic elastomer (TPE) that includes cross-linkable monomers/oligomers (e.g. propoxylated glyceryl triactylate and cyclic trimethylolpropane formal acrylate). In some embodiments, the electrodes 120,130 may contain from 0.01 wt % to 20 wt % carbon nanotubes or nanostructures. In still further embodiments, the nanotubes or nanostructures may have an average length of from about 50 nm to 30 um. Furthermore, the electrodes 120,130 may be formed of any of the materials or techniques used to form the conductive strips disclosed in International Application Publication No. WO 2015/143307 and U.S. application Ser. No. 15/270,626, which are incorporated herein by reference.

Continuing, the active layer or area 110 is formed of any suitable piezoresistive material, which is configured to be, or that is otherwise, flexible, stretchable, or a combination thereof. That is, the piezoresistive material comprises any material that has piezoresistive properties of changing electrical resistance/impedance when subjected to changes in applied pressure/force or applied temperature for example. As such, the piezoresistive material utilized by the active layer 110 contemplated herein may include, but is not limited to: semiconductor material, electrically conductive material or other material having a low electrical conductivity. In some embodiments, the active layer 110 may comprise a polymeric or elastomeric material (e.g. thermoplastic elastomer TPE) which is made to have piezoresistive operation. In one embodiment, the piezoresistive material of the active layer 110 may comprise a composite of any suitable elastomeric piezoresistive material and any suitable ionic liquid-polymer or prepolymer (polymeric ionic liquids), such as room temperature ionic liquids (RTILs), which include but are not limited to: 1-ethyl-3-methylimidazolium tetrafluoroborate (EMIBF4), which in some cases has a glass transition temperature (Tg) of about −95.15° C.; 1-ethyl-3-methylimidazolium bis(trifluoromethylsulfonyl) imide (EMITFSI), which in some cases has a Tg of about −95.15° C.; or 1-butylpyridinium tetrafluoroborate (BPBF4), which in some cases has a Tg of about −66.7° C. In some embodiments, the ionic liquid-polymer may have from 0.01 or more to 10 or less weight percent (wt %) of ionic liquid, based upon the total weight of the active layer 110; the ionic liquid-polymer may have from 0.05 or more to 7.5 or less weight percent (wt %) ionic liquid, based on the total weight of the active layer 110; the ionic liquid-polymer may contain from 0.5 or more to 5 or less weight percent (wt %) ionic liquid based upon the total weight of the active area 110; the ionic liquid-polymer may have from 0.5 or more to 5 or less weight percent (wt %) ionic liquid based upon the total weight of the active layer 110; and the ionic liquid-polymer contains from 1 or more to 2.5 or less weight percent (wt %) ionic liquid based upon the total weight of the active layer 110. In addition, the piezoresistive material forming the active layer 110 may also include one or more conductive nanostructures, such as carbon nanotubes (CNT), including single or multi-walled carbon nanotubes (MWNT), in addition to the ionic liquid-polymer and the polymeric or elastomeric material (e.g. polydimethylsiloxane (PDMS)) for example. Furthermore, the active layer 110 may be formed of any of the materials or techniques used to form the intermediate layer (conductive soft polymer) as disclosed in International Application Publication No. WO 2015/143307 and U.S. application Ser. No. 15/270, 626, which are incorporated herein by reference.

In addition, the sensor 100 may include an insulating layer 140 that is positioned adjacent to the electrode 120 and an insulating layer 150 that is positioned adjacent to the electrode 130. The insulating layers 140,150 function as a dielectric to electrically insulate the electrodes 120,130 from the environment in which the sensor 100 is used. In some embodiments, only one of the insulating layers 140,150 may be used, such that one of the electrodes 120,130 is covered by an insulating layer 140,150, while the other electrode 140,150 is left exposed. However, it should be appreciated that both of the insulating layers 140 and 150 may be omitted from the sensor 100, so long as the active layer 110 and electrodes 120,130 can electrically communicate. In some embodiments, one or more of the insulating layers

140,150 may be provided by the structure to which the sensor 100 to attached or made part of.

Figure 2A:
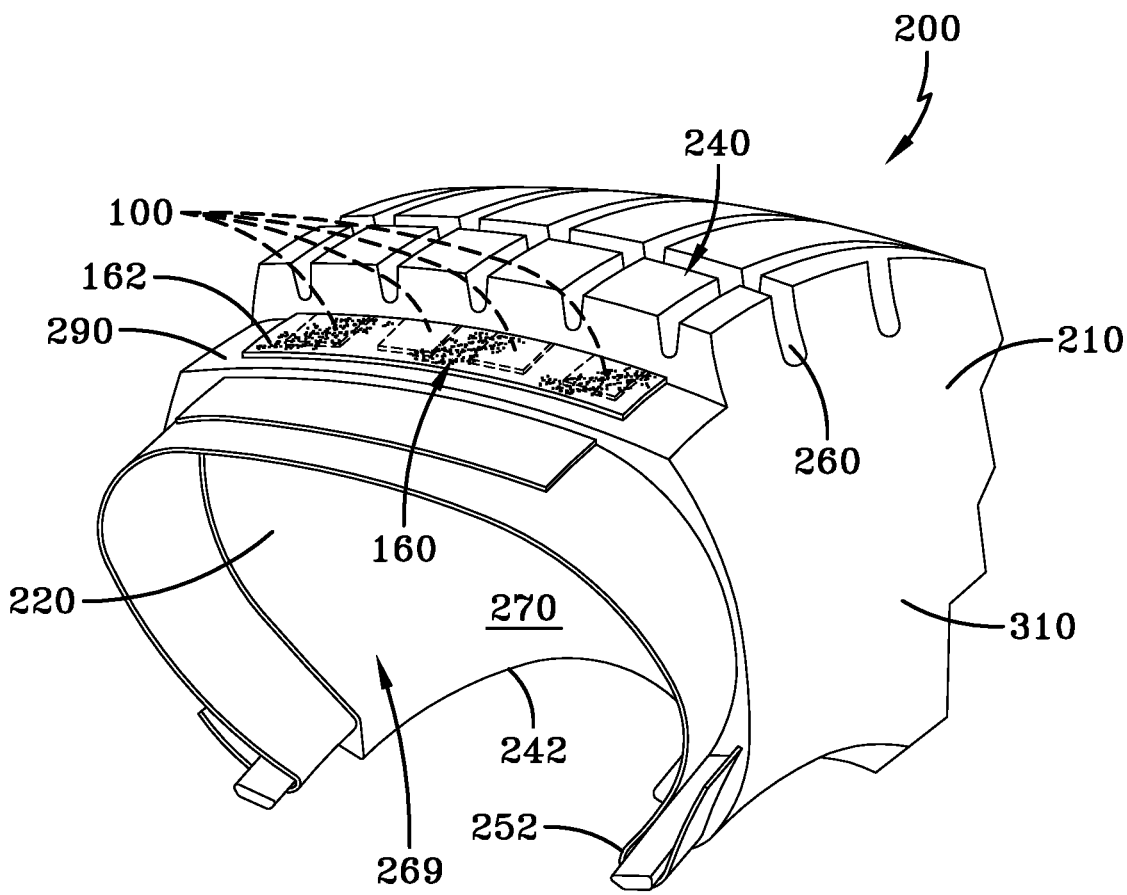
FIG. 2A is a perspective view of a portion of a tire for use with a sheet of flexible sensors in accordance with the concepts of the various embodiments disclosed herein.
Figures 2B, 2C:
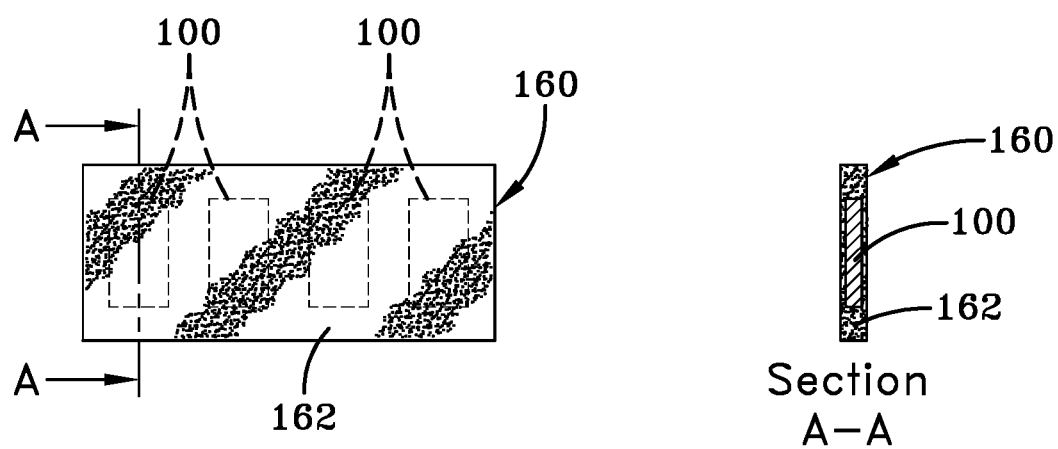
FIG. 2B is a top plan view of the sheet of flexible sensors in accordance with the concepts of the various embodiments disclosed herein.
FIG. 2C is a cross-sectional view of one of the sensors in the sheet of flexible sensors in accordance with the concepts of the various embodiments disclosed herein.

In other embodiments, the sensor 100 may be embodied as a continuous sheet or section 160 carrying a plurality of sensors 100, as shown in FIGS. 2A-C. The sheet of sensors 100 may be configured as a flexible sheet, whereby the sensors 100 are carried by a flexible substrate 162, such as an elastomeric material, such as thermoplastic elastomer (TPE) for example, as well as the materials set forth in International Application Publication No. WO 2015/143307 and U.S. application Ser. No. 15/270,626, which are incorporated herein by reference. Alternatively, the sheet 160 of sensors 100 may be formed by coupling multiple sensors 100 together via their electrodes 120 and 140 to form an array of sensors, so that a detection module or unit 170 to be discussed that is coupled thereto may selectively read the change in impedance/resistance experienced at each one of the plurality of piezoresistive sensors 100 individually as desired. It should be appreciated that the sensors 100 arranged in the sheet 160 may be arranged in any desired pattern or arrangement. It should also be appreciated that by increasing the size of each sensor 100 increases the overall detection area, while the increase in the number of sensors 100 having a smaller overall detection area increases resolution at which changes in operating performance at a specific location of the tire 10 can be identified.

Any suitable elastomer may also be used as a backbone prepolymer for forming the active layer or area 110 and/or the electrodes 120 and 130 of the sensor 100. In addition, the components 110,120,130 of the sensor 100 may also be formed with elastomers that are compatible for use with additive manufacturing (AM) techniques, such as 3D (three-dimensional) printing. For example, elastomers that may be utilized as a backbone prepolymer for the components 110,120,130 of the sensor 100 include, but are not limited to: polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluoresilicone, fluoroelastomers, perfluorelastomers, polyether block amines, chlorosulfonated polyethylene, ethylene-vinyl acetate, thermoplastic elastomer, polyurethane, and mixtures thereof. In another example, the TPE material, such as STRATASYS (Edina, Minn.) TANGO SERIES TPE (photopolymers) having a Shore hardness A of 26-77 may be used as the backbone prepolymer for the components 110, 120,130, which is particularly suitable to match the harness of a tire of about Shore A 70. The material properties of the elastomer may also be further tuned using free radical monomers/oligomers having functional groups (C=C) that can accelerate the cross-linking speed (i.e. fabrication time). In addition, combinations of commercial photopolymers (TPE) or other elastomers, including those discussed herein, with monomers and oligomers may also be utilized to form the backbone of the components 110,120,130 of the sensor 100. For example, such monomers and oligomers may include, but are not limited to: propoxylated glyceryl triactylate and cyclic trimethylolpropane formal acrylate. Blending the prepolymers with photoinitiators (2,2-dimethoxy-2-phenylaceto-phenone; benzoin ethyl ether) and thermal initiators (2,2'-azobis(2-methyl-propionamidine) dihydrochloride, 2,2'-azobis(2-methylpropionitrile)) may also be performed to achieve improved printability during additive manufacturing, such as 3D (three-dimensional) printing of the sensor 100.

The sensor 100 is configured to be interfaced via the electrodes 120,130 with the detection module or unit 170. The detection module 170 includes the necessary hardware, software or combination thereof to carryout the various functions to be discussed. For example, the detection module 170 may comprise any suitable computing unit, including a general purpose computing unit or specialized computing unit. In some embodiments, the detection module 170 may comprise a wheatstone bridge, or any other resistance/impedance measuring circuit or device. As such, the detection module 170 is capable of detecting or identifying changes in electrical behavior, including changes in electrical resistance/impedance, of the sensor 100 that occur as changes in the operating parameters (e.g. pressure and temperature) of the structure being monitored, such as a tire, occur. In other words, the change in impedance/resistance of the sensor 100 are correlated or associated with the magnitude of changes in the operating parameter (tire pressure and/or tire temperature) that is being monitored. It should be appreciated that in lieu of, or as part of, the detection module 170, a wireless communication interface 180 may be provided to transmit wireless signals that embody the operating parameter data collected by the sensor 100 to a remote computing unit 190. The remote computing unit 190 may perform the function of the detection module 170, as well as perform further processing and analysis, whereupon operating status reports, such as reports identifying the "health" of the tire to which the sensor 10 is attached may be created. It should be appreciated that the remote computing unit 190 may comprise any suitable standalone or portable computing unit. In addition, the remote computing unit 190 and the communication interface 180 may communicate data using any suitable wireless communication protocol, such as WIFI or BLUETOOTH for example. In some embodiments, the sensor 100 and detection unit 170 may perform real-time monitoring of the operating parameters.

The sensor 100 is placed into operation by coupling the electrodes 120,130 to the detection module 170. In some embodiments, the detection module 170 then applies a suitable AC (alternating current) or DC (direct current) voltage to the sensor 100. The active area or layer 110 is sensitive to changes in temperature and/or pressure/force, which results in a corresponding change in electrical impedance/resistance of the sensor 100. That is, as force or pressure is applied or removed directly or indirectly to the active layer 110, or as the active layer 110 experiences direct or indirect changes in temperature, the electrical impedance/resistance of the piezoresistive active layer 110 changes from a baseline impedance/resistance value that has been previously calibrated at a predetermined temperature and applied pressure/force. As a result of the change in electrical impedance/resistance (increased or decreased) from the base line value, the electrical current flowing through the active layer 110 is altered (reduced or increased). These changes in impedance/resistance identified by the sensor 100 therefore relate to the physical changes, as well as changes to the operating parameters, which are experienced by the flexible structure, such as a tire, to which the sensor 100 is used. Furthermore, based on the changes (e.g. rate or change or amount of change) in the value of one or more operating parameters, such as temperature and pressure, other information can be generated using mathematical analysis, including statistical analysis. For example, in some embodiments, analysis of the values of the monitored operating parameters may be used to identify a "health" status of the flexible structure or tire, which is desirable. In some embodiments, this health status may identify the remaining operational life of the tire, or may provide other indicators identifying the need for corrective action or repair to the tire or other flexible structure.

While the sensor 100 may be used with any structure having a flexible body or structure, including those that are pneumatically pressurized using any suitable gas such as air, the discussion presented herein relates to the use of the sensor 100 with a tire 200. It should be appreciated that the tire 200 may comprise any suitable tire, such as that for use with any vehicle, including as cars and trucks, or for use on any device, machine, or the like. It should be appreciated, that the tire 200 includes a tire body 210 formed of any suitable material, such as vulcanized rubber. In some embodiments, the tire body 210 may include a pair of spaced annular sidewalls 220 and 230 that are joined by a tread containing annular central section or contact surface 240 that is generally perpendicular to the planes of the laterally positioned sidewalls 220,230. Each of the sidewalls 220,230 includes respective annular openings 242 and 252, which are each referred to in some cases as a bead. The annular openings 242 and 252 are generally coaxial with one another. It should be appreciated that the central section 240 and/or sidewalls 220,230 may be formed of any number of layers of material. For example, the contact surface or central section 240 of the tire 200 includes an outer tread layer 260, which is configured to contact a surface, such as a road surface, upon which the tire 200 rolls. In some embodiments, the tire 200 is mounted to a wheel (not shown) by inserting the wheel through each of the annular openings 242,252 so that the bead formed by the openings 242,252 rests on the wheel. Once mounted on the wheel, a cavity 269 that is formed between an outer surface of the wheel and an inner surface 270 of the tire 200 is inflated with air or other gas, such as nitrogen, to a desired pressure. As a result, the tire 200 is pneumatically pressurized. It should be appreciated that the tire 200 may take on any other suitable design or configuration, including bead-less tires, solid tires, tubed tires, and the like.

Continuing, one or more sensors 100, or in some cases the sheet 160 including a plurality of sensors 100, may be included, so as to be carried by any portion of the body 210 of the tire 200. In some embodiments, the sensor 100 may be adhesively attached to the body 210 of the tire 200, or made integral with the body 210 of the tire 200, during the time the tire 200 is being manufactured, or at a time subsequent to the manufacturing of the tire 200 using any suitable technique. That is, the sensor 100, or sheet 160 of sensors 100, may be attached to, embedded within, or otherwise incorporated within the structure of the tire body 210, so that the sensor 100 or sheet 160 of sensors 100 are carried by the tire 200. For example, in one embodiment, a plurality of sensors 100 may be provided as the sheet 160, as shown in FIGS. 2A-C, and positioned between one or more layers of material that form the tire 200. In some embodiments, the sheet 160 of sensors 100 may be positioned in, or positioned so as to be proximate or adjacent to, the tread layer 260 of the central section 240 of the tire 200 forming the tread of the tire, which contacts the road or other support surface.

It should also be appreciated that one or more sensors 100 may be applied to or integrated into the tire 200 during its manufacturing (as well as any time subsequent) using any suitable technique, including an additive manufacturing (AM) process, such as a 3D (three-dimensional) printing technique. For example, as shown in FIG. 3A, an initial structure of an incomplete tire 200 is provided in which one layer of the tire 200 is exposed, and identified by reference numeral 290. Next, at FIG. 3B, one or more sensors 100, or the sheet 160 of sensors 100, is applied to the exposed layer 290 of the tire 200. It should be appreciated that the sensor 100 may be applied using any suitable technique, including an additive manufacturing technique, such as 3D (three-dimensional) printing. However, in other embodiments, the sheet 160 of sensors 100 may be previously constructed prior to the time of the manufacture of the tire 200 and then applied to the tire using any suitable technique. Once the sheet 160 of sensors 100 is applied to the exposed layer 290 of the tire 200, one or more additional tire layers are placed or applied over the sheet 160 of sensors 100 to cover it. For example, the tread layer 260 may be applied over the sheet of sensors 100, as shown in FIG. 3C. The tread layer 260 may be formed of rubber or any suitable material. Next, the tread layer 260 is processed through a vulcanization process to impart a tread pattern 300 within the tread layer 260, as shown in FIG. 3D.

Alternatively, instead of forming the tread pattern 300 in the tread layer 260 through a vulcanization process, the tread layer 260 and tread pattern 300, along with the sheet 160 of sensors 100, may be formed using the additive manufacturing process, such as 3D printing. Once the contact layer 240, tread pattern 300 and sheet 160 of sensors 100 are formed, then they are attached to the exposed layer 290 using any suitable technique such as adhesive or thermo-welding for example.

In other embodiments, the tire 200 may be in finished form, as shown in FIGS. 4A-E, and then configured to be retrofit with the sheet 160 of sensors 100. For example, the finished tire 200, as shown in FIG. 4A, may be processed so that a portion or section 295 of the tread layer 260 is removed, as shown in FIG. 4B, to show or reveal a section of the exposed layer 290 beneath. In particular, FIG. 4C shows the sheet 160 of sensors 100 applied to the underside of the portion or section 295 of the tread layer 260, which is opposite to the tread 300 that has been molded into the tread layer 260. Next, as shown in FIG. 4D, the previously created portion or section 295 of the tread layer 260, which includes the sensor 100 or sheet of sensors 100 is applied to the exposed layer 290 of the tire 200 using any suitable technique, such as adhesive for example. Finally, the detector 170 is attached to the tire 200, such as on the inner surface 270 thereof and coupled to the electrodes 120,130 of the one or more sensors 100.

With regard to any of the embodiments discussed herein, including those embodiments discussed with regard to FIGS. 2-4, the detection unit 170 may be positioned on the inner 270 or on the outer surface 310 of the tire 200 using any suitable technique, including but not limited to adhesive and thermo-welding techniques. Alternatively, the detector 170 may be embedded in, or between, any of the layers of the tire 200 before or after the vulcanization process. In addition, the electrodes 120,130 of the sensor 100 may be routed through one or more layers of the tire 200 or between various layers of the tire 200 so they are coupled to the detector 170.

Thus, the sensor 100 or sheet 160 of sensors 100 can be readily incorporated into an existing tire manufacturing process, and can be positioned proximate or near to the tire tread 300 or at any position relative to the tire 200, including the central section 240 and sidewalls 210,220 of the tire 200, to allow for the detection or monitoring of various operating parameters (e.g. temperature and/or pressure) associated with the tire 200. The operating parameters of the tire 200 may be identified by subsequent processing of the change in impedance/resistance of the sensor 100 detected by the detection unit 170, and may include, but are not limited to: tire load condition (e.g. impact, step loads, sinusoid, etc.), tire wear, tire pressure, tire temperature, tire health, tire blowout, tire tread separation, etc. Furthermore, the disclosures of International Application Publication No. WO 2015/143307 and U.S. application Ser. No. 15/270,626 are incorporated herein by reference.

What is claimed is:

1. A tire sensor comprising:
   a tire having a tire body; and
   a flexible sensor carried by said tire body, said sensor to monitor at least one parameter associated with the operation of said tire, wherein said flexible sensor includes:
   a flexible first electrode layer;
   a flexible second electrode layer; and
   a flexible active layer, wherein said active layer is disposed on said second electrode layer and said first electrode layer is disposed on said active layer, and wherein said first electrode and said second electrode are in electrical communication with said active layer.

2. The tire sensor of claim 1, wherein said sensor comprises a sheet of a plurality of sensors.

3. The tire sensor of claim 1, wherein said sensor is attached to an inner surface of said tire body, said inner surface being proximate to the axial center of said tire body.

4. The tire sensor of claim 1, wherein said sensor is integral with said tire body.

5. The tire sensor of claim 1, wherein said sensor is embedded in said tire body.

6. The tire sensor of claim 1, wherein said active layer area is an elastomeric piezoresistive material.

7. The tire sensor of claim 6, wherein said first and second electrode layers each include a composite of an elastomeric material and at least one conductive nanostructure.

8. The tire sensor of claim 6, wherein said elastomeric piezoresistive material includes one or more conductive nanostructures.

9. The tire sensor of claim 8, wherein said elastomeric piezoresistive material includes polydimethylsiloxane (PDMS).

10. The tire sensor of claim 6, wherein said elastomeric piezoresistive material includes an ionic liquid-polymer.

11. The tire sensor of claim 10, wherein said ionic liquid-polymer is a room-temperature ionic liquid-polymer.

12. The tire sensor of claim 11, wherein said room-temperature ionic liquid polymer is selected from the group consisting of: 1-ethyl-3-methylimidazolium tetrafluoroborate (EMIBF4), 1-ethyl-3-methylimidazolium bis(trifluoromethylsulfonyl)imide (EMITFSI); or 1-butylpyridinium tetrafluoroborate (BPBF4).

13. A flexible sensor adapted to be carried by a flexible body to monitor the body, the flexible sensor comprising:
    a flexible first electrode layer;
    a flexible second electrode layer; and
    a flexible active layer, wherein said active layer is disposed on said second electrode layer and said first electrode layer is disposed on said active layer, and wherein said first electrode and said second electrode are in electrical communication with said active layer.

14. The sensor of claim 13, wherein said sensor comprises a sheet of a plurality of sensors.

15. The sensor of claim 13, wherein said active layer is an elastomeric piezoresistive material.

16. The sensor of claim 15, wherein said elastomeric piezoresistive material includes one or more conductive nanostructures.

17. The sensor of claim 16, wherein said elastomeric piezoresistive material comprises polydimethylsiloxane (PDMS).

18. The sensor of claim 15, wherein said elastomeric piezoresistive material is an ionic liquid-polymer.

19. The sensor of claim 18, wherein said ionic liquid-polymer is a room-temperature ionic liquid-polymer.

20. The sensor of claim 19, wherein said room-temperature ionic liquid-polymer is selected from the group consisting of: 1-ethyl-3-methylimidazolium tetrafluoroborate (EMIBF4), 1-ethyl-3-methylimidazolium bis(trifluoromethylsulfonyl)imide (EMITFSI); or 1-butylpyridinium tetrafluoroborate (BPBF4).

* * * * *